(12) United States Patent
Xin et al.

(10) Patent No.: US 12,001,659 B2
(45) Date of Patent: Jun. 4, 2024

(54) METHOD OF GENERATING NOTE, ELECTRONIC DEVICE AND STORAGE MEDIUM

(71) Applicant: Beijing Baidu Netcom Science Technology Co., Ltd., Beijing (CN)

(72) Inventors: Yongzheng Xin, Beijing (CN); Shuangshuang Cui, Beijing (CN); Wensi Su, Beijing (CN); Huibin Zhao, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 18/300,224

(22) Filed: Apr. 13, 2023

(65) Prior Publication Data

US 2023/0251769 A1    Aug. 10, 2023

(30) Foreign Application Priority Data

Apr. 15, 2022  (CN) .......................... 202210401361.1

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 3/0488* (2013.01); *G06F 40/166* (2020.01)

(58) Field of Classification Search
CPC .... G06F 3/0482; G06F 3/0484; G06F 3/0488; G06F 40/166
See application file for complete search history.

(56) References Cited

U.S. PATENT DOCUMENTS 9,323,733 B1 * 4/2016 McGhee ................. G06F 21/62
9,912,744 B1 * 3/2018 Anbalagan ............. H04L 51/52
(Continued)

FOREIGN PATENT DOCUMENTS

| CN | 107885439 | 4/2018 |
| JP | 08-287063 | 11/1996 |
| JP | 08-305702 | 11/1996 |

OTHER PUBLICATIONS

Japanese Office Action, issued in the corresponding Japanese Patent Application No. 2023-020906, dated Feb. 14, 2024, 10 pages.
(Continued)

*Primary Examiner* — Seth A Silverman
(74) *Attorney, Agent, or Firm* — HSML P.C.

(57) ABSTRACT

Provided are a method of generating a note, an electronic device, and a storage medium, which relate to a field of artificial intelligence, and in particular to fields of information processing and e-book technology. The method includes: displaying, in a process of displaying an e-book reading page, at least one note combination option for a first note generation instruction, in response to the first note generation instruction being detected; determining a second note generation instruction associated with a target note combination option, in response to an operation of selecting the target note combination option from the at least one note combination option; and combining a current character content associated with the first note generation instruction with a target character content associated with the second note generation instruction, so as to generate a combined note content.

20 Claims, 12 Drawing Sheets

(51) Int. Cl.
  *G06F 3/0488* (2022.01)
  *G06F 40/166* (2020.01)

(56) References Cited

U.S. PATENT DOCUMENTS

| | | | |
|---|---|---|---|
| 2008/0256114 | A1 | 10/2008 | Rasmussen et al. |
| 2010/0324709 | A1* | 12/2010 | Starmen ............... G06F 40/169 |
| | | | 715/810 |
| 2011/0087955 | A1* | 4/2011 | Ho ....................... G06F 40/106 |
| | | | 715/251 |
| 2018/0032145 | A1* | 2/2018 | Denoue ............... G06F 3/04842 |
| 2018/0275867 | A1* | 9/2018 | Kroupa ................ G06F 3/0483 |

OTHER PUBLICATIONS

Indian Office Action, issued in the corresponding Indian Patent Application No. 202324027618, dated Mar. 7, 2024, 7 pages.
Palm jp, "Method of inputting characters ; a method of copying and pasting", available at https://serai.jp/living/1017327#google_vignette, Feb. 5, 2021, 10 pages with English abstract.

* cited by examiner

METHOD OF GENERATING NOTE, ELECTRONIC DEVICE AND STORAGE MEDIUM

CROSS-REFERENCE TO RELATED APPLICATIONS

This application is claims priority to Chinese Application No. 202210401361.1 filed on Apr. 15, 2022, which is incorporated herein by reference in its entirety.

TECHNICAL FIELD

The disclosure relates to a field of artificial intelligence, in particular to fields of information processing and e-book technology, and may be applied to a scenario of generating an e-book note.

BACKGROUND

With the development of the digital and online reading mode, e-book reading is favored by more and more users. However, in some scenarios, the e-book reading has phenomenon of fragmented note content and inefficient note content management.

SUMMARY

The present disclosure provides a method of generating a note, an electronic device, and a storage medium.

According to an aspect of the present disclosure, a method of generating a note is provided, including: displaying, in a process of displaying an e-book reading page, at least one note combination option for a first note generation instruction, in response to the first note generation instruction being detected; determining a second note generation instruction associated with a target note combination option, in response to an operation of selecting the target note combination option from the at least one note combination option; and combining a current character content associated with the first note generation instruction with a target character content associated with the second note generation instruction, so as to generate a combined note content.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the above-mentioned method of generating a note.

According to another aspect of the present disclosure, a non-transitory computer-readable storage medium having computer instructions stored thereon is provided, wherein the computer instructions are configured to cause a computer to implement the above-mentioned method of generating a note.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the present disclosure better and do not constitute a limitation to the present disclosure, in which.

DETAILED DESCRIPTION OF EMBODIMENTS

Exemplary embodiments of the present disclosure will be described below with reference to the accompanying drawings, which include various details of the embodiments of the present disclosure to facilitate understanding and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

The terms used here are only for describing specific embodiments, and are not intended to limit the present disclosure. The terms "include", "comprise", etc. used herein indicate an existence of described characteristics, steps, operations and/or components, but do not exclude a presence or addition of one or more other characteristics, steps, operations or components.

Unless otherwise defined, all terms (including technical and scientific terms) used herein have the meanings commonly understood by those skilled in the art. It should be noted that the terms used here should be interpreted as having meanings consistent with the context of the specification, and should not be interpreted in an idealized or overly rigid manner.

In the case of using an expression similar to "at least one of A, B, C, etc.", generally speaking, it should be interpreted according to the meaning of the expression commonly understood by those skilled in the art (for example, "a system having at least one of A, B, and C" shall include, but is not limited to, a system having A alone, B alone, C alone, A and B, A and C, B and C, and/or A, B and C, etc.).

The embodiments of the present disclosure provide a method of generating a note. This method includes: displaying, in a process of displaying an e-book reading page, at least one note combination option for a first note generation instruction, in response to the first note generation instruction being detected; determining a second note generation instruction associated with a target note combination option, in response to an operation of selecting the target note combination option from the at least one note combination option; and combining a current character content associated with the first note generation instruction with a target character content associated with the second note generation instruction, so as to generate a combined note content.

Figure 1:
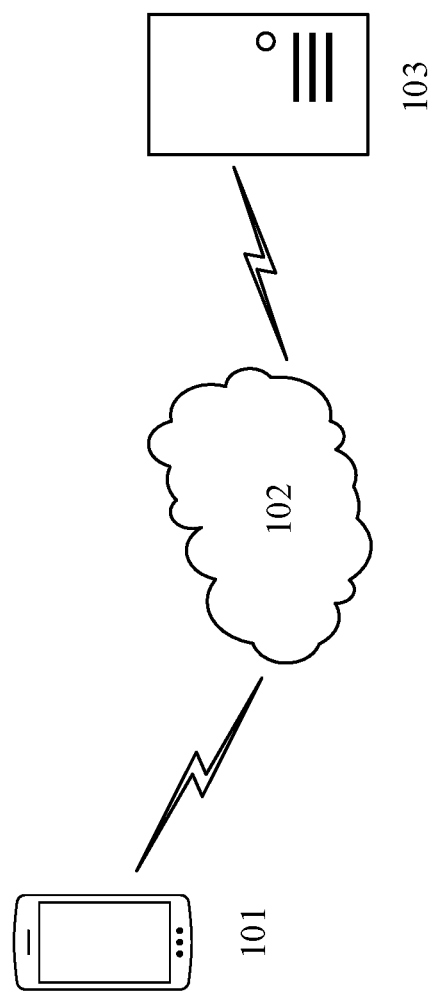
FIG. 1 schematically shows a system architecture of a method and an apparatus of generating a note according to an embodiment of the present disclosure.

FIG. 1 schematically shows a system architecture of a method and an apparatus of generating a note according to an embodiment of the present disclosure. It should be noted that FIG. 1 is only an example of system architectures in which the embodiments of the present disclosure may be applied to help those skilled in the art understand the technical content of the present disclosure, but it does not mean that the embodiments of the present disclosure may not be used in other devices, systems, environments or scenarios.

A system architecture 100 according to the embodiment may include a display terminal 101, a network 102 and a server 103. The network 102 is used to provide a medium for communication links between the display terminal 101 and the server 103. The network 102 may include various connection types, such as a wired communication link, a wireless communication link, or a fiber cable etc. The server 103 may be an independent physical server, a server cluster or a distributed system composed of a plurality of physical servers, and may be a cloud server that provides basic cloud computing services such as a cloud service, a cloud computing, a network service, and a middleware service, etc.

The display terminal 101 interacts with the server 103 through the network 102, so as to receive or transmit data, etc. For example, the display terminal 101 may be a user terminal with a display function, such as a mobile phone, a notebook computer, a tablet computer, a reader, etc., and the display terminal 101 may be used to display an e-book reading page or an e-book note page.

The server 103 may be a server that provides various services, such as a background processing server (only an example) that combines note content according to a detected note generation operation.

For example, in a process of displaying an e-book reading page by using the display terminal 101, the server 103 displays at least one note combination option for a first note generation instruction, in response to the first note generation instruction being detected; determines a second note generation instruction associated with a target note combination option, in response to an operation of selecting the target note combination option from the at least one note combination option; and combines a current character content associated with the first note generation instruction with a target character content associated with the second note generation instruction, so as to generate a combined note content.

It should be noted that the method of generating a note provided by the embodiments of the present disclosure may be executed by the server 103. Correspondingly, the apparatus of generating a note provided by the embodiments of the present disclosure may be disposed in the server 103. The method of generating a note provided by the embodiments of the present disclosure may also be executed by a server or a server cluster different from the server 103 and capable of communicating with the display terminal 101 and/or the server 103. Correspondingly, the apparatus of generating a note provided by the embodiments of the present disclosure may also be disposed in the server or the server cluster different from the server 103 and capable of communicating with the display terminal 101 and/or the server 103.

It should be understood that the numbers of display terminals, networks and servers in FIG. 1 are merely illustrative. According to implementation needs, there may be any number of display terminals, networks and servers.

The embodiments of the present disclosure provide a method of generating a note. The method of generating a note according to the exemplary embodiment of the present disclosure is described with reference to FIGS. 2 to 4H in combination with the system architecture of FIG. 1. The method of generating a note according to the embodiment of the present disclosure may be executed by the server 103 shown in FIG. 1, for example.

Figure 2:
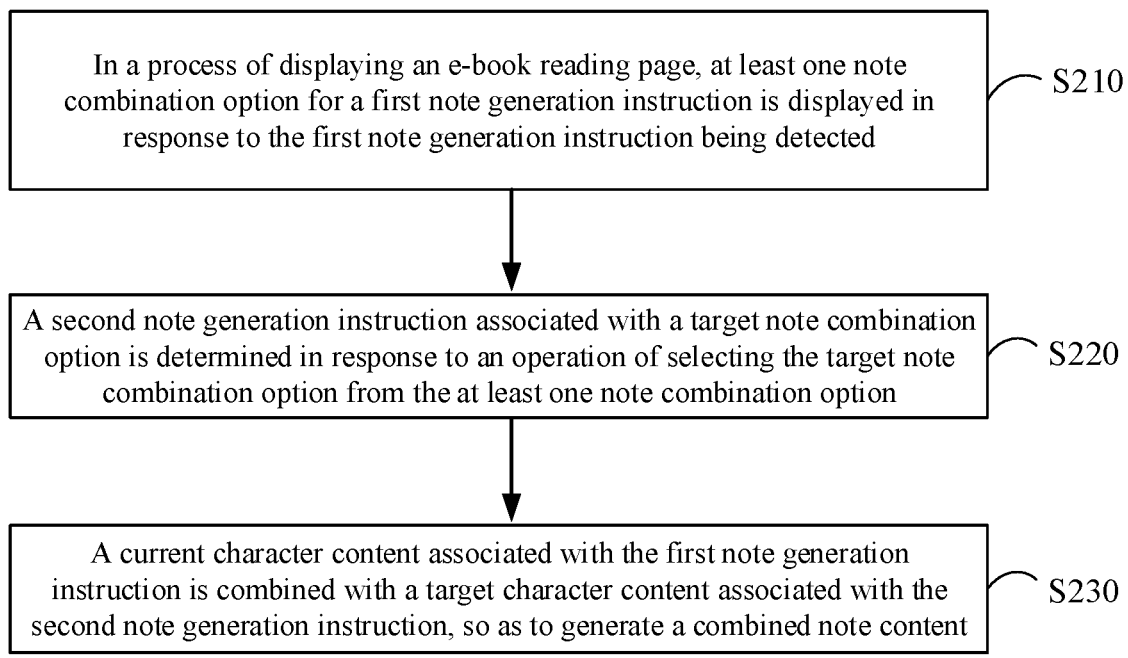
FIG. 2 schematically shows a flowchart of a method of generating a note according to an embodiment of the present disclosure.

FIG. 2 schematically shows a flowchart of a method of generating a note according to an embodiment of the present disclosure.

As shown in FIG. 2, a method 200 of generating a note according to an embodiment of the present disclosure may include operations S210 to S230.

In operation S210, in a process of displaying an e-book reading page, at least one note combination option for a first note generation instruction is displayed in response to the first note generation instruction being detected.

In operation S220, a second note generation instruction associated with a target note combination option is determined in response to an operation of selecting the target note combination option from the at least one note combination option.

In operation S230, a current character content associated with the first note generation instruction is combined with a target character content associated with the second note generation instruction, so as to generate a combined note content.

The following example illustrates an example process of each operation of the method of generating a note according to this embodiment.

For example, in a process of displaying an e-book reading page, at least one note combination option for a first note generation instruction is displayed in response to the first note generation instruction being detected. The first note generation instruction may be generated by a preset operation for a current character content in the e-book reading page. The first note generation instruction is used to instruct the generation of an e-book note based on the current character content, for example, used to instruct the current character content as a note content.

The note combination option may be used to instruct to combine the character contents associated with at least two note generation instructions, so as to generate the combined note content. At least one note combination option for the first note generation instruction is displayed in response to the first note generation instruction being detected. The note combination option indicates a manner in which the target character content to be combined with the current character content is combined with the current character content and a position relationship between the target character content to be combined with the current character content and the current character content. The current character content includes the character content targeted by the first note generation instruction.

A second note generation instruction associated with a target note combination option is determined in response to an operation of selecting the target note combination option from the at least one note combination option. In an example, according to the position relationship between the target character content to be combined with the current character content and the current character content indicated by the target note combination option, a candidate note generation instruction closest to the first note generation instruction is determined from among at least one candidate note generation instruction corresponding to a character content that satisfies the aforementioned position relationship with respect to the current character content, as the second note generation instruction associated with the target note combination option.

The candidate note generation instruction closest to the first note generation instruction is a note generation instruction corresponding to a character content that is closest to the current character content. The candidate note generation instruction, which satisfies the requirement of the position relationship and is closest to the first note generation instruction, is determined as the second note generation instruction associated with the target note combination option. This conducive to achieving an efficient and convenient e-book note combination method, improving the relevance and operability of e-book note generation, and effectively solving the problem of e-book note fragmentation.

The position relationship between the target character content and the current character content, for example, may include the target character content being located at a position in front of the current character content, or the target character content being located at a position behind the current character content. The candidate note generation instruction closest to the first note generation instruction may be a note generation instruction preceding the first note generation instruction, or a note generation instruction following the first note generation instruction. The candidate note generation instruction closest to the first note generation instruction may be a detected note generation instruction or a note generation instruction that has not been detected.

According to the position relationship between the target character content and the current character content indicated by the target note combination option, a detected note generation instruction preceding or following the first note generation instruction is determined as the second note generation instruction associated with the target note combination option.

The character content corresponding to the note generation instruction preceding the first note generation instruction is located in front of the current character content. A generation time of the preceding note generation instruction is not necessarily earlier than a generation time of the first note generation instruction. The character content corresponding to the note generation instruction following the first note generation instruction is located behind the current character content. The generation time of the following note generation instruction is not necessarily later than the generation time of the first note generation instruction.

In an another example, according to the position relationship between the target character content to be combined with the current character content and the current character content indicated by the target note combination option, from among at least one candidate note generation instruction corresponding to a character content that satisfies the position relationship with respect to the current character content, a candidate note generation instruction, which is closest to the first note generation instruction and for which the associated note combination option matching the target note combination option is selected, is determined as the second note generation instruction associated with the target note combination option.

If a candidate note generation instruction among the candidate note generation instructions satisfying the requirement of the position relationship is closest to the first note generation instruction and an associated note combination option is selected for this candidate note generation instruction, the candidate note generation instruction is determined as the second note generation instruction associated with the target note combination option. This may improve the relevance and operability of e-book note generation, effectively solve the problem of e-book note fragmentation, and satisfy the diversified note combination requirement of the user.

The candidate note generation instruction, which is closest to the first note generation instruction and for which the associated note combination option matching the target note combination option is selected, may be separated from the first note generation instruction by N note generation instructions, N being an integer greater than or equal to 0. The target note combination option indicates the position relationship between the current character content and the target character content. The associated note combination option matched with the target note combination option indicates a position relationship corresponding to the aforementioned position relationship.

According to the position relationship indicated by the target note combination option, a previous note generation instruction or a next note generation instruction, which is closest to the first note generation instruction and for which the associated note combination option is selected, is determined as the second note generation instruction associated with the target note combination option. The candidate note generation instruction closest to the first note generation instruction is a note generation instruction corresponding to a character content that is closest to the current character content.

The character content corresponding to the note generation instruction preceding the first note generation instruction is located in front of the current character content. A generation time of the preceding note generation instruction is not necessarily earlier than a generation time of the first note generation instruction. The character content corresponding to the note generation instruction following the first note generation instruction is located behind the current character content. A generation time of the following note generation instruction is not necessarily later than the generation time of the first note generation instruction.

The candidate note generation instruction, which is closest to the first note generation instruction and for which the associated note combination option is selected, may be a detected note generation instruction or a note generation instruction that has not been detected.

A current character content associated with the first note generation instruction is combined with a target character content associated with the second note generation instruction, so as to generate a combined note content. The current character content may be combined with the target character content in a preset combination manner. For example, the current character content may be merged with the target character content, or a specific connector may be added between the current character content and the target character content.

Through the embodiments of the present disclosure, in a process of displaying an e-book reading page, at least one note combination option for a first note generation instruction is displayed in response to the first note generation instruction being detected; a second note generation instruction associated with a target note combination option is determined in response to an operation of selecting the target note combination option from the at least one note combination option; and a current character content associated with the first note generation instruction is combined with a target character content associated with the second note generation instruction, so as to generate a combined note content.

Combining the character content associated with a plurality of note generation instructions to form a single combined note content may effectively solve the problem of e-book note fragmentation, effectively reduce the secondary collation for the e-book note, reduce the time cost consumption of e-book note management, and effectively improve the e-book learning efficiency. In addition, it is also conducive to improving the convenience of e-book note generation, and may effectively improve the user experience of e-book note generation.

Figure 3:
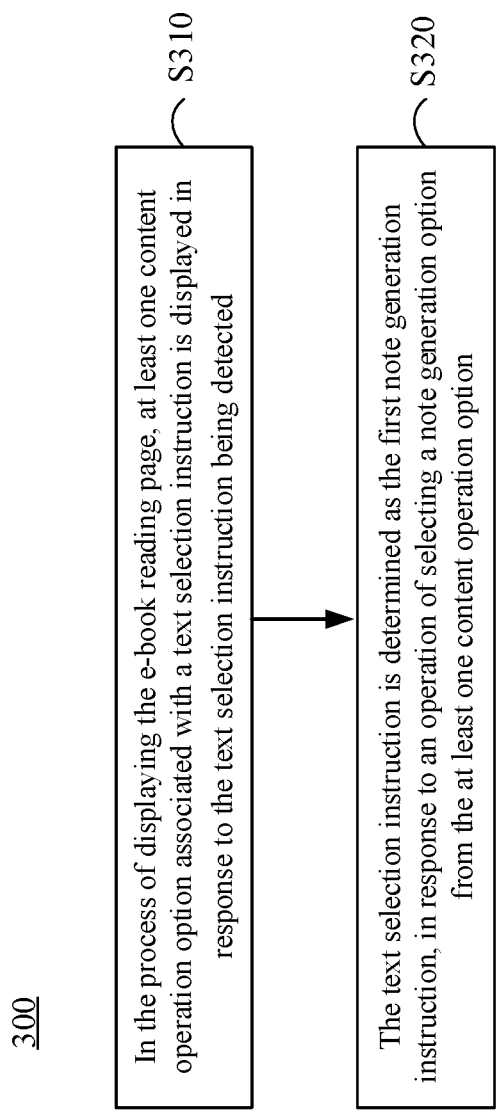
FIG. 3 schematically shows a flowchart of a method of determining a first note generation instruction according to an embodiment of the present disclosure.

FIG. 3 schematically shows a flowchart of a method of determining a first note generation instruction according to an embodiment of the present disclosure.

As shown in FIG. 3, a method 300 of determining a first note generation instruction according to an embodiment of the present disclosure may include operations S310 to S320.

In operation S310, in the process of displaying the e-book reading page, at least one content operation option associated with a text selection instruction is displayed in response to the text selection instruction being detected.

In operation S320, the text selection instruction is determined as the first note generation instruction, in response to an operation of selecting a note generation option from the at least one content operation option.

The following example illustrates an example process of each operation of the method of determining a first note generation instruction according to this embodiment.

For example, in the process of displaying the e-book reading page, at least one content operation option associated with a text selection instruction is displayed in response to the text selection instruction being detected. The text selection instruction is used to select the character content in the e-book reading page. The text selection instruction may be generated based on an operation such as a click selecting event, a select movement event or a touch movement event in the e-book reading page.

The content operation option indicates an operation option that may be performed for the selected character content, such as a note generation option, a copy option, an add annotation option, and a share operation option. For example, at least one content operation option associated with the text selection instruction may be displayed in form of a selection box.

The text selection instruction is determined as the first note generation instruction, in response to an operation of selecting a note generation option from the at least one content operation option. The operation of selecting the note generation option may be a click operation or a touch operation, for example. After determining the text selection instruction as the first note generation instruction, the character content selected by the text selection instruction is determined as the current character content associated with the first note generation instruction.

In an example, the text selection instruction is a touch movement event for the current character content in the e-book reading page. In a process of determining the first note generation instruction, the touch movement event is determined as the text selection instruction and at least one content operation option associated with the touch movement event is displayed, in response to the touch movement event being detected.

The touch movement event is determined as the first note generation instruction in response to an operation of selecting the note generation option from the at least one content operation option. The note generation option, for example, may be an underlining operation option. Therefore, the touch movement event is determined as the first note generation instruction, in response to an operation of selecting an underlining operation option from the at least one content operation option.

A character content selected by the touch movement event is determined as the current character content associated with the first note generation instruction. For example, the current character content associated with the first note generation instruction is obtained by: determining a touch movement starting position and a touch movement ending position that are associated with the touch movement event; and determining a character content between the touch movement starting position and the touch movement ending position as the current character content associated with the first note generation instruction.

At least one note combination option for a first note generation instruction is displayed in response to the first note generation instruction being detected. For example, the touch movement event is determined as the first note generation instruction and at least one note combination option for the touch movement event is displayed, in response to the operation of selecting the underlining operation option from the at least one content operation option. The at least one note combination option may include, for example, an option of connecting to previous underlining and an option of connecting to next underlining.

A second note generation instruction associated with a target note combination option is determined in response to an operation of selecting the target note combination option from the at least one note combination option. The target note combination option indicates a position relationship between the target character content and the current character content. Specifically, the target note combination option may be an option of connecting to previous underlining or an option of connecting to next underlining.

In an example, when determining the second note generation instruction associated with the target note combination option, the note generation instruction indicated by the underlining operation preceding or following the touch movement event may be determined as the second note generation instruction. The character content corresponding to the preceding underlining operation or the following underlining operation is determined as the target character content to be combined with the current character content.

In another example, when determining the second note generation instruction associated with the target note combination option, the candidate note generation instruction, which is closest to the touch movement event and for which the associated note combination option is selected, is determined as the second note generation instruction. The associated note combination option is a note combination option corresponding to the target note combination option.

For example, when the target note combination option is the option of connecting to previous underlining, the associated note combination option matched with the target note combination option is the option of connecting to next underlining. When the target note combination option is the option of connecting to next underlining, the associated note combination option matched with the target note combination option is the option of connecting to previous underlining.

When the target note combination option is the option of connecting to previous underlining, the note generation instruction indicated by the previous underlining operation, which is closest to the touch movement event and for which the option of connecting to next underlining is selected, may be determined as the second note generation instruction. When the target note combination option is the option of connecting to next underlining, the note generation instruction indicated by the next underlining operation, which is closest to the touch movement event and for which the option of connecting to previous underlining is selected, may be determined as the second note generation instruction.

For example, in response to an operation of deselecting a note combination option, a disassociation is performed on a combined note content corresponding to the deselected note combination option. Performing the disassociation on the combined note content may improve the flexibility of e-book note management and effectively optimize the user experience of a reading application.

At least one content operation option associated with the text selection instruction is displayed in response to the text selection instruction being detected, effectively improving the intuitive and convenient of e-book note generation. The text selection instruction is determined as the first note generation instruction in response to the operation of selecting the note generation option from the at least one content operation option, effectively improving the accuracy of the first note generation instruction recognition. Generating the combined note content based on the touch movement event may effectively improve the efficiency of e-book note generation and the user experience of e-book note generation.

FIGS. 4A to 4H schematically show a process of generating a note according to an embodiment of the present disclosure.

The process of generating a note may include, for example, a plurality of sub-processes of generating a note as shown in FIGS. 4A to 4H.

Figure 4A:
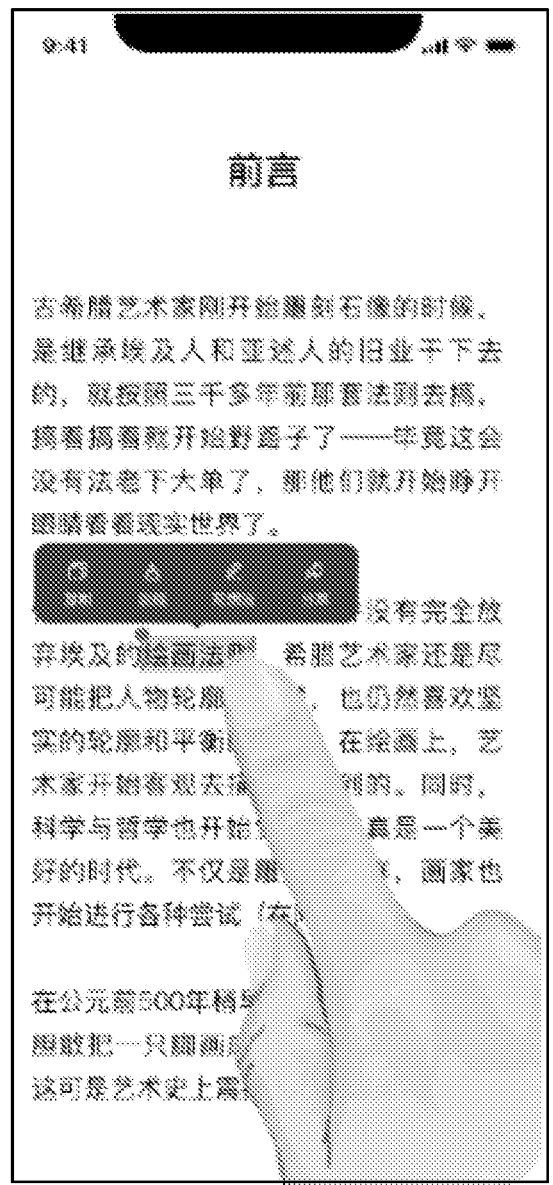
FIGS. 4A to 4H schematically show a process of generating a note according to an embodiment of the present disclosure.

As shown in FIG. 4A, in a process of displaying an e-book reading page, at least one content operation option associated with the touch movement event is displayed in response to the touch movement event being detected. The at least one content operation option includes a copy option, an underlining operation option, an idea writing operation option, and a share operation option.

Figure 4B:
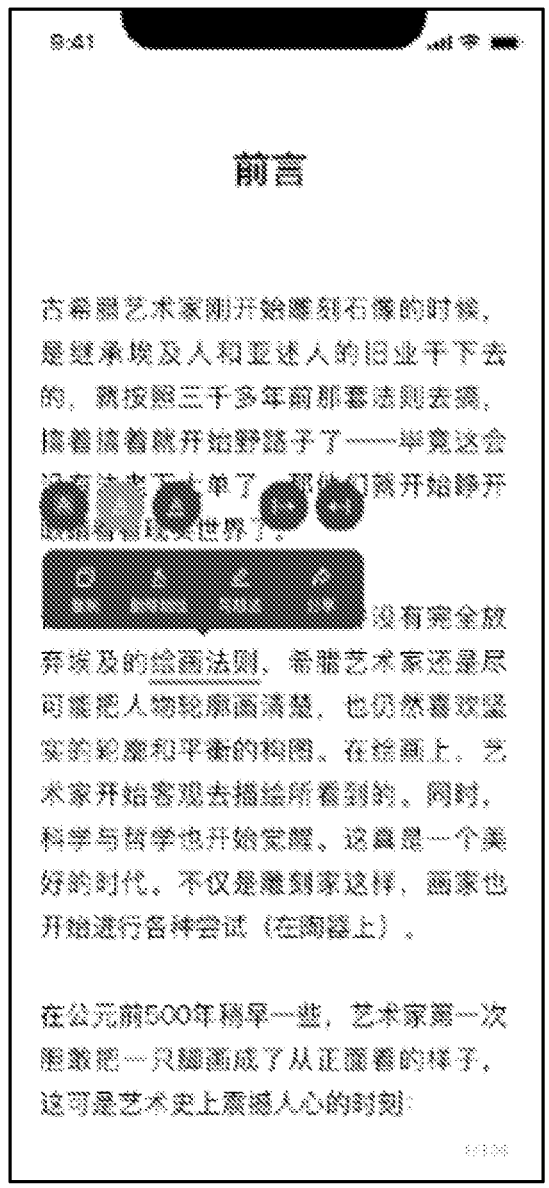

As shown in FIG. 4B, the touch movement event is determined as the first note generation instruction, in response to an operation of selecting an underlining operation option from the at least one content operation option. At least one note combination option for the touch movement event is displayed, and the at least one note combination option includes an option of connecting to previous underlining (←|) and an option of connecting to next underlining (|→). In addition, the current character content (Chinese characters "绘画法 则") selected by the touch movement event may further be marked as an underlining state, and an underlining style option may be displayed.

Figure 4C:
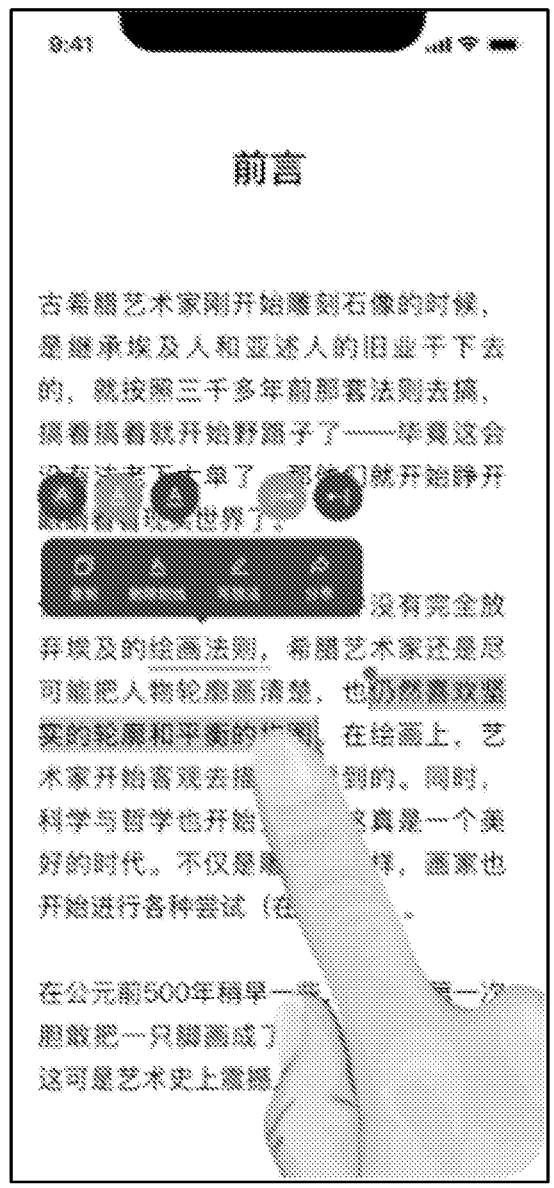

As shown in FIG. 4C, a second note generation instruction associated with a target note combination option is determined in response to an operation of selecting the target note combination option. For example, in response to an operation of selecting the option of connecting to next underlining being detected, an underlining style option of the current character content is marked as a combined underline (-••), and a second note generation instruction associated with the option of connecting to next underlining is determined.

When determining the second note generation instruction associated with the option of connecting to next underlining, a note generation instruction indicated by the next underlining operation associated with the touch movement event may be determined as the second note generation instruction. A character content corresponding to the next underlining operation is determined as the target character content to be combined with the current character content.

Figure 4D:
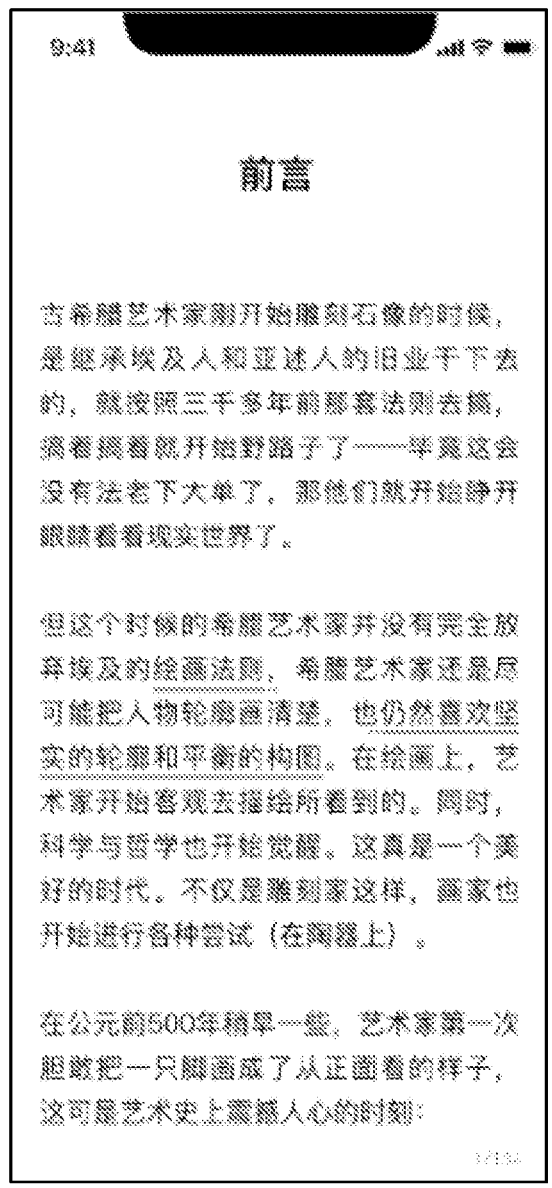

As shown in FIG. 4D, in response to the next underlining operation in the e-book reading page being detected, the character content corresponding to the next underlining operation is determined as the target character content to be combined with the current character content. The next underlining operation may be automatically selected to connect the previous underlining option. The underlining style option for the target character content is the combined underline (••-).

Figure 4E:
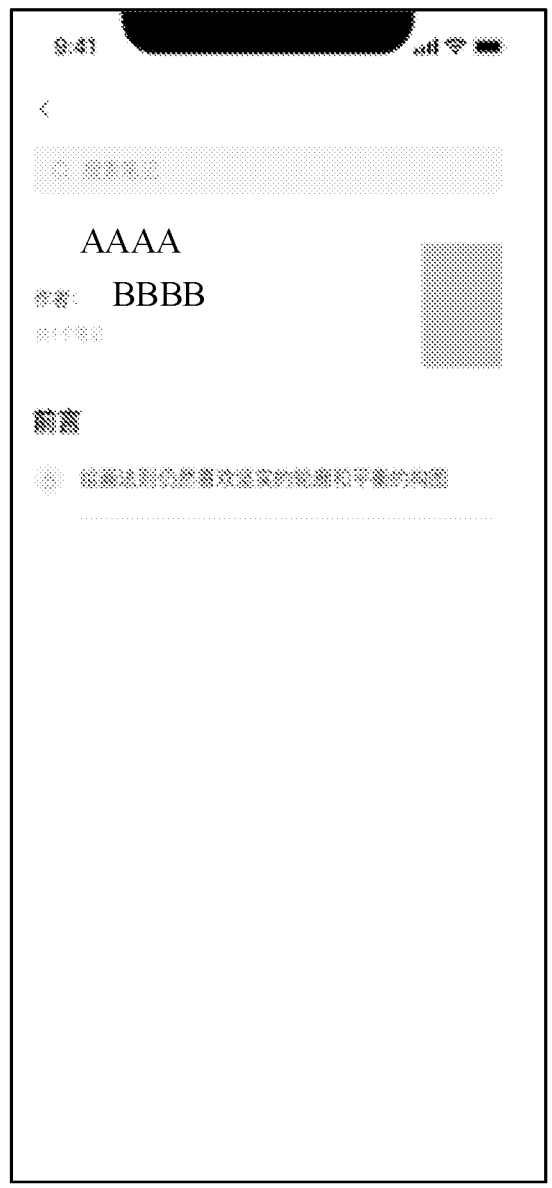

As shown in FIG. 4E, the current character content (Chinese characters "绘画 法则")is combined with the target character content (Chinese characters "仍然喜欢坚实的轮廓和平衡的构图")to generate the combined note content (Chinese characters "绘画法则 仍然喜欢坚实的轮廓和平衡的构图"), and the combined note content is displayed on the e-book note page.

Figure 4F:

As shown in FIG. 4F, in response to an operation of repeating selecting the underlining operation option being detected, at least one content operation option for the operation of repeating selecting is displayed. At least one content operation option includes a copy option, an underline deletion option, an idea writing operation option, a share operation option, an option of connecting to previous underlining (←|), and an option of connecting to next underlining (|→).

Figure 4G:
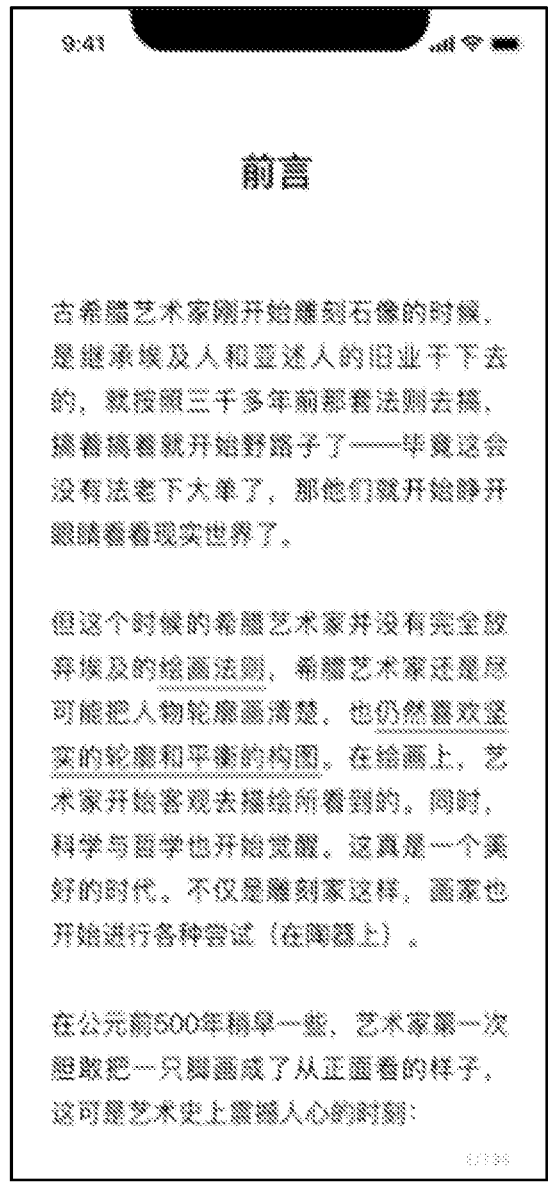

As shown in FIG. 4G, in response to an operation of repeating selecting the selected content operation option being detected, the content operation option which is repeated selected is deselected. For example, in response to an operation of repeating selecting the selected option of connecting to next underlining, the option of connecting to next underlining is deselected, and the underlining style options of the current character content and the target character content are marked as non-combined underlines.

Figure 4H:
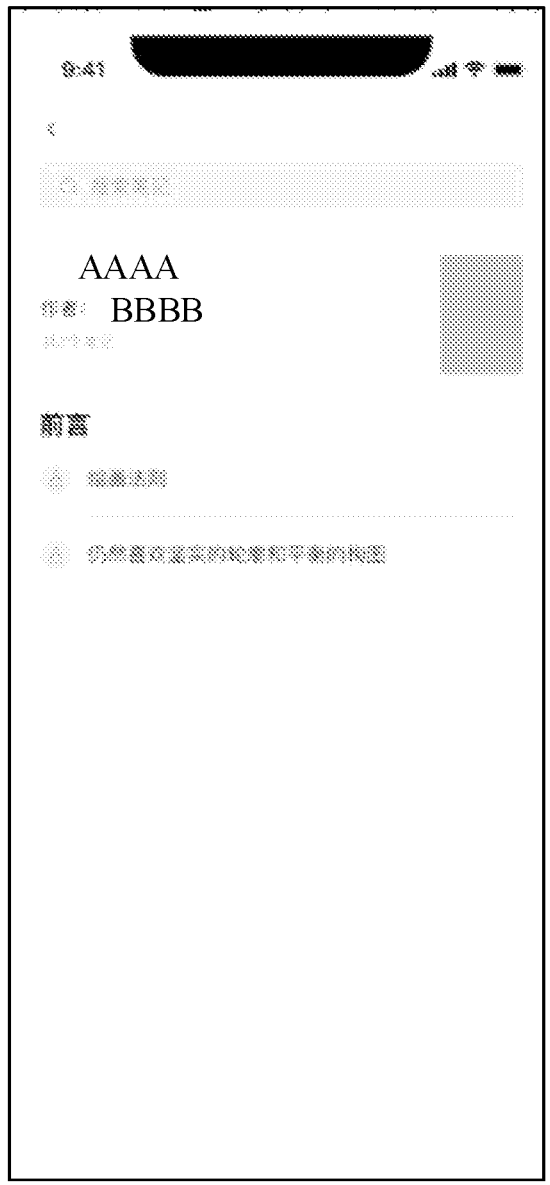

As shown in FIG. 4H, a disassociation is performed on the combined note content (Chinese characters "绘画法则仍然喜欢坚 实的轮廓和平衡的构图"),which is obtained by combining the current character content (Chinese characters "绘画法则")with the target character content (Chinese characters "仍然喜欢坚实的轮廓和平衡的构图"),and the current character content (Chinese characters "绘画法则")and the target character content (Chinese characters "仍然喜欢坚实的轮廓和平衡的构图")are displayed separately on the e-book note page.

Figure 5:
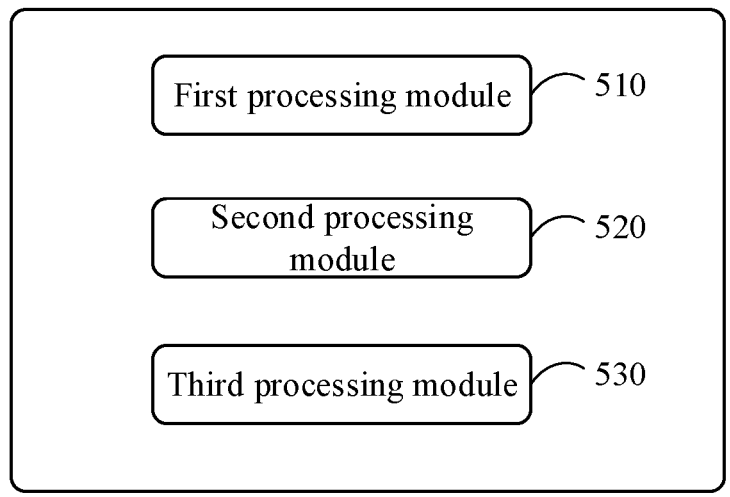
FIG. 5 schematically shows a block diagram of an apparatus of generating a note according to an embodiment of the present disclosure.

FIG. 5 schematically shows a block diagram of an apparatus of generating a note according to an embodiment of the present disclosure.

As shown in FIG. 5, an apparatus 500 of generating a note according to an embodiment of the present disclosure, for example, includes a first processing module 510, a second processing module 520 and a third processing module 530.

The first processing module 510 is used to display, in a process of displaying an e-book reading page, at least one note combination option for a first note generation instruction, in response to the first note generation instruction being detected. The second processing module 520 is used to determine a second note generation instruction associated with a target note combination option, in response to an operation of selecting the target note combination option from the at least one note combination option. The third processing module 530 is used to combine a current character content associated with the first note generation instruction with a target character content associated with the second note generation instruction, so as to generate a combined note content.

Through the embodiments of the present disclosure, in a process of displaying an e-book reading page, at least one note combination option for a first note generation instruction is displayed in response to the first note generation instruction being detected; a second note generation instruction associated with a target note combination option is determined in response to an operation of selecting the target note combination option from the at least one note combination option; and a current character content associated with the first note generation instruction is combined with a target character content associated with the second note generation instruction, so as to generate a combined note content.

Combining the character content associated with a plurality of note generation instructions to form a single combined note content may effectively solve the problem of e-book note fragmentation, effectively reduce the secondary collation for the e-book note, reduce the time cost consumption of e-book note management, and effectively improve the e-book learning efficiency. In addition, it is also conducive to improving the convenience of e-book note generation, and may effectively improve the user experience of e-book note generation.

According to an embodiment of the present disclosure, the note combination option indicates a positional relationship between the target character content to be combined with the current character content and the current character content. The second processing module includes a first processing sub-module used to determine, from among at least one candidate note generation instruction corresponding to a character content that satisfies the positional relationship with respect to the current character content, a candidate note generation instruction closest to the first note generation instruction as the second note generation instruction associated with the target note combination option.

According to an embodiment of the present disclosure, the note combination option indicates a positional relationship between the target character content to be combined with the current character content and the current character content. The second processing module includes a second processing sub-module used to determine, from among at least one candidate note generation instruction corresponding to a character content that satisfies the positional relationship with respect to the current character content, a candidate note generation instruction, which is closest to the first note generation instruction and for which an associated note combination option matching the target note combination option is selected, as the second note generation instruction associated with the target note combination option.

According to an embodiment of the present disclosure, the apparatus further includes: a fourth processing module used to display, in the process of displaying the e-book reading page, at least one content operation option associated with a text selection instruction, in response to the text selection instruction being detected; and a fifth processing module used to determine the text selection instruction as the first note generation instruction, in response to an operation of selecting a note generation option from the at least one content operation option.

According to an embodiment of the present disclosure, the fourth processing module includes a third processing sub-module used to determine a touch movement event as the text selection instruction and display at least one content operation option associated with the touch movement event, in response to the touch movement event being detected. The fifth processing module includes a fourth processing sub-module used to determine the touch movement event as the first note generation instruction, in response to an operation of selecting an underlining operation option from the at least one content operation option.

According to an embodiment of the present disclosure, the first processing module includes a fifth processing sub-module used to display at least one note combination option for the touch movement event, in response to the operation of selecting the underlining operation option from the at least one content operation option, and the at least one note combination option includes an option of connecting to previous underlining and an option of connecting to next underlining.

According to an embodiment of the present disclosure, the apparatus further includes a sixth processing module used to determine the current character content associated with the first note generation instruction. The sixth processing module includes a sixth processing sub-module used to determine a touch movement starting position and a touch movement ending position that are associated with the touch movement event, and a seventh processing sub-module used to determine a character content between the touch movement starting position and the touch movement ending position as the current character content associated with the first note generation instruction.

According to an embodiment of the present disclosure, the apparatus further includes a seventh processing module used to perform, in response to an operation of deselecting a note combination option, a disassociation on a combined note content corresponding to the deselected note combination option.

It should be noted that in the technical solution of the present disclosure, the collection, storage, use, processing, transmission, provision, disclosure and application of the user's personal information involved are all in compliance with the relevant laws and regulations, and do not violate the public order and good customs.

According to an embodiment of the present disclosure, the present disclosure further provides an electronic device, a readable storage medium, and a computer program product.

Figure 6:
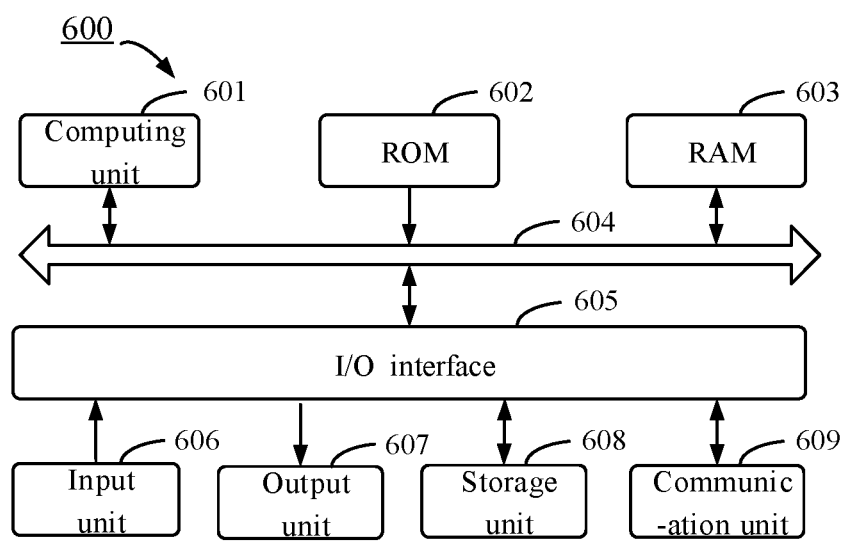
FIG. 6 schematically shows a block diagram of an electronic device for performing a method of generating a note according to an embodiment of the present disclosure.

FIG. 6 schematically shows a block diagram of an electronic device for performing a method of generating a note according to an embodiment of the present disclosure.

FIG. 6 shows a schematic block diagram of an exemplary electronic device 600 for implementing the embodiments of the present disclosure. The electronic device 600 is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 6, the device 600 may include a computing unit 601, which may perform various appropriate actions and processing based on a computer program stored in a read-only memory (ROM) 602 or a computer program loaded from a storage unit 608 into a random access memory (RAM) 603. Various programs and data required for the operation of the device 600 may be stored in the RAM 603. The computing unit 601, the ROM 602 and the RAM 603 are connected to each other through a bus 604. An input/output (I/O) interface 605 is further connected to the bus 604.

Various components in the device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the device 600 to exchange information/data with other devices through a computer network such as the Internet and/or various telecommunication networks.

The computing unit 601 may be various general-purpose and/or special-purpose processing components with processing and computing capabilities. Some examples of the computing unit 601 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 601 may perform the various methods and processes described above, such as the method of generating a note. For example, in some embodiments, the method of generating a note may be implemented as a computer software program that is tangibly contained on a machine-readable medium, such as a storage unit 608. In some embodiments, part or all of a computer program may be loaded and/or installed on the device 600 via the ROM 602 and/or the communication unit 609. When the computer program is loaded into the RAM 603 and executed by the computing unit 601, one or more steps of the method of generating a note described above may be performed. Alternatively, in other embodiments, the computing unit 601 may be used to perform the method of generating a note in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user), and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A method of generating a note, comprising:
   displaying, in a process of displaying an e-book reading page, at least one note combination option for a first note generation instruction, in response to the first note generation instruction being detected;
   determining a second note generation instruction associated with a target note combination option, in response to an operation of selecting the target note combination option from the at least one note combination option; and
   combining a current character content associated with the first note generation instruction with a target character content associated with the second note generation instruction, so as to generate a combined note content,
   wherein the note combination option indicates a positional relationship between the target character content to be combined with the current character content and the current character content,
   wherein the combining a current character content associated with the first note generation instruction with a target character content associated with the second note generation instruction comprises: combining, according to a positional relationship indicated by the target note combination option, the current character content associated with the first note generation instruction with the target character content associated with the second note generation instruction.

2. The method according to claim 1, wherein:
   determining the second note generation instruction associated with the target note combination option, in response to the operation of selecting the target note combination option from the at least one note combination option comprises:
   determining, from among at least one candidate note generation instruction corresponding to a character content that satisfies the positional relationship indicated by the target note combination option with respect to the current character content, a candidate note generation instruction closest to the first note generation instruction as the second note generation instruction associated with the target note combination option.

3. The method according to claim 1, wherein:
   determining the second note generation instruction associated with the target note combination option, in response to the operation of selecting the target note combination option from the at least one note combination option comprises:
   determining, from among at least one candidate note generation instruction corresponding to a character content that satisfies the positional relationship indicated by the target note combination option with respect to the current character content, a candidate note generation instruction, which is closest to the first note generation instruction and for which an associated note combination option matching the target note combination option is selected, as the second note generation instruction associated with the target note combination option.

4. The method according to claim 1, further comprising:
   displaying, in the process of displaying the e-book reading page, at least one content operation option associated with a text selection instruction, in response to the text selection instruction being detected; and
   determining the text selection instruction as the first note generation instruction, in response to an operation of selecting a note generation option from the at least one content operation option.

5. The method according to claim 4,
   wherein displaying the at least one content operation option associated with the text selection instruction, in response to the text selection instruction being detected comprises:
   determining a touch movement event as the text selection instruction and displaying at least one content operation option associated with the touch movement event, in response to the touch movement event being detected; and
   wherein determining the text selection instruction as the first note generation instruction, in response to the operation of selecting the note generation option from the at least one content operation option comprises:
   determining the touch movement event as the first note generation instruction, in response to an operation of selecting an underlining operation option from the at least one content operation option.

6. The method according to claim 5, wherein displaying the at least one note combination option for the first note generation instruction, in response to the first note generation instruction being detected comprises:
   displaying at least one note combination option for the touch movement event, in response to the operation of selecting the underlining operation option from the at least one content operation option,
   wherein the at least one note combination option comprises an option of connecting to previous underlining and an option of connecting to next underlining.

7. The method according to claim 5, wherein the current character content associated with the first note generation instruction is obtained by:
   determining a touch movement starting position and a touch movement ending position that are associated with the touch movement event; and
   determining a character content between the touch movement starting position and the touch movement ending position as the current character content associated with the first note generation instruction.

8. The method according to claim 1, further comprising:
   performing, in response to an operation of deselecting a note combination option, a disassociation on a combined note content corresponding to the deselected note combination option.

9. An electronic device, comprising:
   at least one processor; and
   a memory communicatively connected to the at least one processor, wherein the memory stores instructions executable by the at least one processor, and the instructions, when executed by the at least one processor, cause the at least one processor to implement the method of claim 1.

10. The electronic device according to claim 9, wherein:
    the at least one processor is further configured for:
    determining, from among at least one candidate note generation instruction corresponding to a character content that satisfies the positional relationship indicated by the target note combination option with respect to the current character content, a candidate note generation instruction closest to the first note generation instruction as the second note generation instruction associated with the target note combination option.

11. The electronic device according to claim 9, wherein: the at least one processor is further configured for:
   determining, from among at least one candidate note generation instruction corresponding to a character content that satisfies the positional relationship indicated by the target note combination option with respect to the current character content, a candidate note generation instruction, which is closest to the first note generation instruction and for which an associated note combination option matching the target note combination option is selected, as the second note generation instruction associated with the target note combination option.

12. The electronic device according to claim 9, wherein the at least one processor is further configured for:
   displaying, in the process of displaying the e-book reading page, at least one content operation option associated with a text selection instruction, in response to the text selection instruction being detected; and
   determining the text selection instruction as the first note generation instruction, in response to an operation of selecting a note generation option from the at least one content operation option.

13. The electronic device according to claim 12,
   wherein the at least one processor is further configured for:
      determining a touch movement event as the text selection instruction and displaying at least one content operation option associated with the touch movement event, in response to the touch movement event being detected; and
   wherein the at least one processor is further configured for:
      determining the touch movement event as the first note generation instruction, in response to an operation of selecting an underlining operation option from the at least one content operation option.

14. The electronic device according to claim 13, wherein the at least one processor is further configured for:
   displaying at least one note combination option for the touch movement event, in response to the operation of selecting the underlining operation option from the at least one content operation option,
   wherein the at least one note combination option comprises an option of connecting to previous underlining and an option of connecting to next underlining.

15. The electronic device according to claim 13, wherein the at least one processor is further configured to obtain the current character content associated with the first note generation instruction by:
   determining a touch movement starting position and a touch movement ending position that are associated with the touch movement event; and
   determining a character content between the touch movement starting position and the touch movement ending position as the current character content associated with the first note generation instruction.

16. The electronic device according to claim 9, wherein the at least one processor is further configured for:
   performing, in response to an operation of deselecting a note combination option, a disassociation on a combined note content corresponding to the deselected note combination option.

17. A non-transitory computer-readable storage medium having computer instructions stored thereon, wherein the computer instructions are configured to cause a computer to implement the method of claim 1.

18. The storage medium according to claim 17, wherein: the computer instructions are further configured to cause the computer to:
   determine, from among at least one candidate note generation instruction corresponding to a character content that satisfies the positional relationship indicated by the target note combination option with respect to the current character content, a candidate note generation instruction closest to the first note generation instruction as the second note generation instruction associated with the target note combination option.

19. The storage medium according to claim 17, wherein: the computer instructions are further configured to cause the computer to:
   determine, from among at least one candidate note generation instruction corresponding to a character content that satisfies the positional relationship indicated by the target note combination option with respect to the current character content, a candidate note generation instruction, which is closest to the first note generation instruction and for which an associated note combination option matching the target note combination option is selected, as the second note generation instruction associated with the target note combination option.

20. The storage medium according to claim 17, wherein the computer instructions are further configured to cause the computer to:
   display, in the process of displaying the e-book reading page, at least one content operation option associated with a text selection instruction, in response to the text selection instruction being detected; and
   determine the text selection instruction as the first note generation instruction, in response to an operation of selecting a note generation option from the at least one content operation option.

\* \* \* \* \*